Nov. 17, 1959 L. P. THOMAS 2,913,521

ELECTRICAL SIGNAL AMPLIFIERS

Filed March 10, 1953

INVENTOR.
LUCIUS P. THOMAS
BY [signature]
ATTORNEY 2,913,521

ELECTRICAL SIGNAL AMPLIFIERS

Lucius P. Thomas, West Collingswood, N.J., assignor to Radio Corporation of America, a corporation of Delaware Application March 10, 1953, Serial No. 341,417

12 Claims. (Cl. 178—7.3)

The present invention relates to improvements in electrical signal amplifiers and more particularly, although not necessarily exclusively, to electrical signal amplifiers of the broad band signal variety.

The present invention further relates to improvements in signal amplifying devices of the frequency discriminatory type wherein one band of frequencies handled by the amplifier is to be accentuated over an adjacent band of frequencies handled by the amplifier.

In electrical signal amplifying systems it is many times expedient to employ a signal amplifying stage which tends to boost certain signal frequencies with respect to other signal frequencies whereby to realize certain corrections in the waveform delivered by the amplifier. Corrections or modifications in the waveform of the signal delivered by an amplifier may also be made by inculcating in the design of the amplifier certain response characteristics which are a function of the amplitude of the signal applied to the amplifier. This latter form of signal waveform correction is often referred to as "stretching" or "compressing" portions of the applied signal.

Perhaps one of the most common examples of signal amplifying systems in which both forms of signal waveform correction is desirable is found in the television art. Here it is quite often desirable to correct the waveform of the amplified signal not only from a frequency component standpoint but also from an amplitude linearity standpoint. For example, in signal amplifiers designated to handle video signal information including both picture signal components and synchronizing signal components, it is common in the prior art to make special design provisions to insure that the frequency and phase of the video signal components are not disturbed while the synchronizing signal component, represented by higher amplitude excursions of the video signal, is either stretched or compressed.

A specific application of these waveform correcting principles may be found in television receiver video amplifier design, where it is well known that a single stage of video frequency amplification may be made to supply one output terminal with wide band undistorted picture signal while supplying another terminal with a low frequency accentuated version of the composite video signal which tends to reduce noise effects and accentuate synchronizing signal information. This is generally accomplished by providing a pentode amplifier tube, representing a constant current generator, with a two section anode load circuit, one section having a relatively flat frequency response while the other section has a low frequency accentuation characteristic. Synchronizing signal is taken from the low frequency accentuation portion of the load circuit. It has been found, however, that if such an amplifier is direct current coupled to a video signal detector which delivers a direct current component representing signal strength as well as image brightness information, the screen electrode dissipation on the amplifier becomes excessive during the reception of very low strength signals. Moreover, it has been found in such amplifiers that due to the screen electrode characteristic of most pentodes the synchronizing signal waveform produced by low frequency boost suffers through an inherent amplitude compression in the signal amplifier.

It, therefore, is an object of the present invention to provide an improved signal amplifying circuit which permits both frequency correction and amplitude correction of an applied waveform.

It is another object of the present invention to provide an improved amplifier circuit which finds ready application to amplification of television signals so as to provide accentuation of the synchronizing signal component, while not affecting the picture signal components of the signal.

It is another object of the present invention to provide an improved pentode amplifier in which screen electrode dissipation is reduced for low signal excitation.

It is another object of the present invention to provide an improved pentode amplifier circuit in which the linearity of the amplifier for higher signal excursions is improved over prior art arrangements.

In the realization of the above objects and features of advantage, the practice of the present invention in one of its more general forms, employs a pentode amplifier tube having an anode output circuit including a linear frequency response section and a low frequency accentuation section. The screen electrode of the pentode is then connected to the junction between the linear frequency response section and the low frequency accentuation section. The screen electrode connection may be made to the load circuit through a frequency correction circuit tending to extend the frequency response of signals developed at the screen electrode. One output signal terminal for the amplifier is then established at the junction of the linear response section of the load circuit with the low frequency boost section and another output signal terminal is established at the anode electrode.

In the practice of the present invention it may be found that a pentode vacuum tube having its screen electrode connected in a degenerative fashion to a point in the anode load circuit may reflect excessive Miller capacitance effects on the signal driving circuit. In television circuits this may tend to decrease the high frequency response of the stage preceding the pentode amplifier of the present invention.

It is therefore a further object of the present invention to provide an improved pentode amplifier circuit in which signal distortion is controlled via screen degeneration without affecting to any appreciable extent the frequency response of the previous stage.

A more complete understanding of the present invention as well as a fuller appreciation of its objects and other features of advantage will be gained by a reading of the following specification especially when taken in connection with the accompanying drawings, in which.

Figures 1, 2, 3:
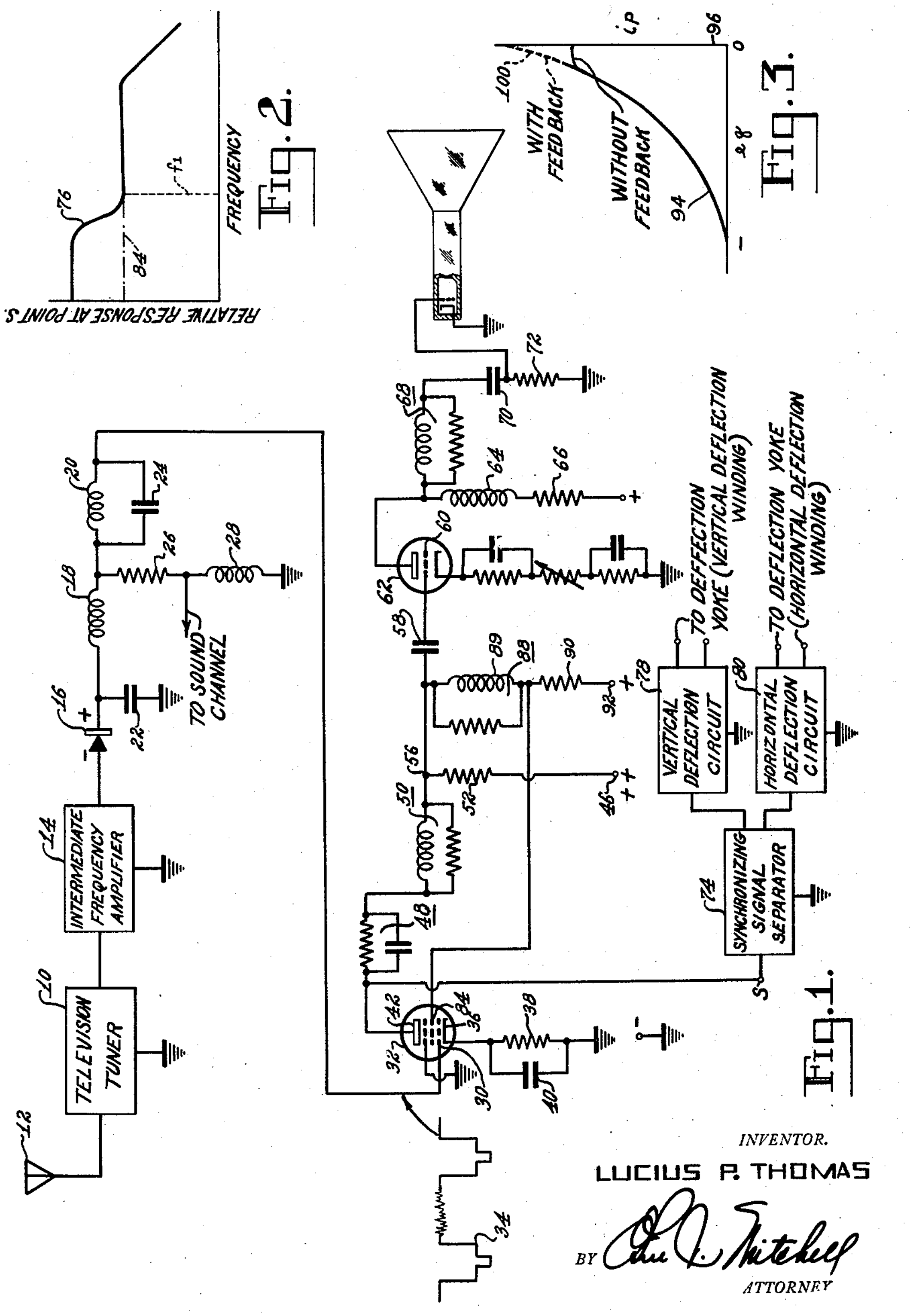
Figure 1 is a combination block and schematic representation of one embodiment of the present invention.
Figure 2 is a graphical representation of certain frequency response characteristics that may be encountered in the practice of the present invention.
Figure 3 is a graphical representation of typical pentode tube amplifier stage characteristics as modified in the practice of the present invention.

Turning now to Figure 1, there is shown at 10 a conventional television tuner embracing an RF amplifier, a superheterodyne mixer and local oscillator. Incoming television signal is intercepted by antenna 12 and applied to the television tuner 10 so as to produce an intermediate frequency version of the received signal for application to the intermediate frequency amplifier 14. Output signals from the intermediate frequency amplifier 14 are applied in a conventional manner to a diode detector circuit including the diode element 16. Inductors 18 and 20, capacitors 22 and 24, as well as resistor 26 and inductor 28 act in accordance with well known principles to provide a wide band load circuit for the diode 16.

A demodulated television signal is developed by the diode 16 across the load elements 26 and 28 and applied through intercarrier sound beat trap circuit 20—24 to the control electrode 30 of the pentode amplifier tube 32. Demodulated video signal may appear at the output of trap circuit 20—24 substantially as shown by curve at 34. The cathode 36 of the pentode 32 is connected with ground in the conventional manner through the self-bias resistor 38 which is in turn by-passed by capacitor 40. In accordance with prior art techniques, the anode 42 of the pentode 32 is connected with a source of positive operating potential at 46 through a load circuit including the resistance-capacitance time constant circuit 48, inductance-resistance circuit 50 and resistor 52. With the appropriate selection of circuit constants, in accordance with well known amplifier design techniques, the signal frequency response characteristics of the amplifier stage embracing tube 32 will be substantially flat from control electrode 30 to output terminal 56. Signals appearing at terminal 56 are then coupled via capacitor 58 to the control electrode 60 of the video output amplifier tube 62. Anode power for the tube 62 is supplied through inductor 64 and resistor 66. Video signal for the application to a picture reproducing kinescope is taken from the vacuum tube 62 output circuit through the inductor 68 and capacitance 70 which are connected with the upper terminal of resistor 72.

In further accordance with well known amplifier design techniques the time constant of circuit 48 connected in the anode circuit of the pentode amplifier 32 is so chosen as to accentuate low frequency signal components. Signals appearing at the anode 42 of pentode 32 are then coupled to a synchronizing signal separator circuit of any conventional form or represented by the block element 74. The manner in which the low frequency components of signals in the output circuit of vacuum tube 32 are boosted or accentuated is illustrated by the graph of Figure 2. The solid line curve 76 of Figure 2 represents the frequency response characteristic of the amplifier taken from the control electrode 30 to point S indicated as the input terminal to the synchronizing signal separator circuit 74. As can be seen by the solid line 76 in Figure 2, the low frequency components up to frequency $f_1$ are boosted. This will tend to reduce high frequency noise components in the signal applied to the synchronizing signal separator 74 and tend to improve the operation of the vertical and horizontal deflection circuits 78 and 80 under noisy signal conditions. By way of comparison, the dash-dot line 84 in Figure 2 illustrates the frequency response characteristic of the amplifier 32 up to terminal 56 which is capacitively coupled to the input circuit of video output amplifier 62.

In accordance with the present invention, the screen electrode 84 of the pentode amplifier tube 32, instead of being connected to a fixed source of positive bias potential as in prior art systems, is connected to the output circuit or anode load circuit of tube 32 via the inductance-resistance combination 88. Some screen electrode current is supplied through an auxiliary resistance 90 connected with a power supply terminal 92 less positive with respect to ground than terminal 46. In some instances it will be found in the practice of the present invention that it is not necessary to employ the resistance-inductance combination 88 especially where rather narrow band width signals are being amplified. This aspect of circuit design and operation will be discussed hereinafter.

The effects of the novel circuit arrangement provided by the present invention is best seen through reference to Figure 3 where the solid line curve 94 represents the plate current versus control electrode voltage characteristic of the tube 32. It will be seen that this characteristic is a rising characteristic even in the vicinity of zero grid bias represented by the vertical ordinate 96. Without the negative feedback in the screen electrode circuit provided by the present invention, the plate current versus grid voltage characteristic of the pentode amplifier stage would be illustrated by the solid line 94. With the negative feedback provided by the present invention the upper end of the characteristic is extended as shown by dotted line 100. Thus, it can be seen that the white portions of the video signal 34 will be less apt to be compressed by the circuit arrangement of the present invention than where the screen electrode is established at a fixed potential as in prior art systems.

It is further noteworthy that in the practice of the present invention the screen electrode power dissipation of the pentode amplifier tube 32 will be reduced for weak signal conditions inasmuch as the increase in anode current of the pentode 32 (under conditions of weak signal) will tend to produce an additional voltage drop through resistor 90 thereby reducing the actual screen electrode voltage. As noted hereinabove the inductor-resistance combination 88 need not always be employed in the practice of the present invention. However, it will be seen that due to the fact that the signal developed at the terminal 56 is a combination effect resulting from (*a*) anode current changes through resistor 52 and (*b*) screen electrode current changes through resistor 52, care must be taken that the frequency component balance of signals developed at the screen electrode is comparable to the frequency balance of signals produced by anode current flow. Thus the inductor 89 may be considered as a peaking inductor for the screen electrode circuit, the value of which is so selected in accordance with lumped circuit capacitance appearing at the screen electrode so as to render the frequency response characteristic from the screen electrode 84 to the amplifier terminal 56 substantially flat over the same range of frequencies handled by the anode circuit of pentode 32. It is a further noteworthy feature of the present invention that when the value of inductor 89 has been properly established, the Miller capacitance effects which are reflected on the control electrode 30 of vacuum tube 32 by merit of the screen electrode 84 not being held at AC ground potential are minimized. This minimizes the capacitive loading on the load circuit of the detector 16 and permits wider band pass operation at higher gain of the entire video amplifier system. The resistor connected in shunt with inductor 89 modifies the frequency discriminatory effect of the inductor 89 and hence provides means for determining the effect inductor 89 will have on the frequency response of the amplifier circuit. Likewise it is obvious that the inductor 89 may be supplemented or substituted with other passive circuit elements to modify the frequency response characteristic of the amplifier stage. It is therefore seen that the novel connection of the screen electrode 84 to the anode load circuit by means of a frequency discriminatory signal coupling agency provides advantages which may be realized regardless of the nature of the anode load circuit.

From the above description it can be seen that the present invention permits the realization of an improved amplifier system for wide band signals, for example, of the television variety. One embodiment of the present invention permits a pentode vacuum tube to be used in this wide band amplifier system with the advantage of less screen dissipation and a more desirable frequency response and gain characteristics than provided by prior art systems.

What is claimed is:

1. In a wide band untuned amplifier system adapted to handle a first and second adjacent bands of frequencies, the combination of: an electron discharge tube having at least an anode, cathode, control electrode and screen electrode; a source of wide band signals of the type described coupled in driving relation to said control electrode; a circuit ground terminal; a connection from said cathode to said circuit ground terminal; a source of positive power supply voltage having a power supply terminal referenced with respect to said circuit ground terminal; a frequency accentuation circuit including means electrically accentuating said first band of frequencies to the relative exclusion of said second band of frequencies and a linear frequency response circuit embracing both bands of frequencies connected in series with one another to form a combination load circuit; a connection from the accentuation circuit end of said load circuit to said anode electrode, and a connection from the linear response means end of said load circuit to said positive power supply terminal, and a signal feedback connection including means communicating both bands of frequencies from a point on said load circuit between said accentuation circuit and said linear frequency response circuit to said screen electrode.

2. In a wide band untuned amplifier system adapted to handle a relatively wide band of signal frequencies having low frequency components and high frequency components, the combination of: an electron discharge tube having at least an anode, cathode, control electrode and screen electrode; a source of wide band signals of the type described coupled in driving relation between said control electrode and cathode; a circuit ground terminal; a connection from said cathode to said circuit ground terminal; a source of positive power supply voltage having a terminal referenced with respect to said circuit ground terminal; a low frequency accentuation circuit including means accentuating substantially only those signal frequencies corresponding to said low frequency components to the relative exclusion of said high frequency components; a linear frequency response circuit yielding substantial response to both said high and low frequency components connected in series with said accentuation circuit to form a combination load circuit; a connection from the accentuation circuit end of said load circuit to said anode electrode; a connection from the linear response end of said load circuit to said positive power supply terminal; and a wide band feedback means connected between said screen electrode and the junction of said low frequency accentuation circuit and said linear frequency response circuit to feed back to said screen electrode signal information representing both said low and high frequency components.

3. In an electrical signal amplifying system, the combination of: an electron discharge tube having an anode, cathode, control electrode and auxiliary electrode interposed between said control electrode and said anode; a signal load circuit connected between said anode and said cathode including power supply means; a low frequency accentuation circuit and a linear frequency response circuit connected in series with one another in said load circuit so that said accentuation circuit is adjacent said anode; and a feedback connection from a point in said load circuit between said low frequency accentuation circuit and said linear frequency response circuit to said auxiliary electrode.

4. Apparatus according to claim 3 wherein there is additionally provided an inductance means connected between said point in said load circuit between said low frequency accentuation circuit and said linear frequency response circuit to said auxiliary electrode.

5. In a video signal amplifying system, the combination of: a circuit ground terminal; a source of video signal having a synchronizing component extending in a negative direction; an electron discharge tube having an anode, cathode, control electrode and screen electrode; signal coupling means connected between said video signal source and said control electrode; a first resistance means connected from said cathode to said circuit ground terminal; a by-pass capacitor connected in shunt with said first resistance means; a first source of positive power supply potential having positive and negative terminals with its negative terminal connected with said circuit ground terminal; a second resistance means, a first inductor and a third resistance means connected in series in that order between said discharge tube anode and the positive terminal of the power supply; a first capacitor connected in shunt with at least a portion of said second resistance means; a fourth resistance means connected in shunt with said first inductor; a second inductor connected from said screen electrode to the anode extremity of said third resistance means; and video signal responsive means coupled to said anode designated for selective response to said synchronizing component.

6. A video signal amplifying system according to claim 5 wherein there is additionally provided a wide band video amplifier having its input circuit connected with said third resistance means and wherein said video signal responsive means comprises a signal separator circuit having its input circuit coupled with said second resistance means.

7. A video amplifier apparatus for a television signal having relatively low frequency synchronizing components and a relatively wide band scene brightness components which include low frequencies falling in the range of said synchronizing component, said apparatus comprising in combination: a signal amplifier device having electrode corresponding to a cathode, anode, control grid and screen grid, the control grid versus anode current transfer characteristic of said device having an undesirable non-linear portion for anode currents above a predetermined maximum; means coupled between said cathode and control grid for applying television signals of the type described in driving relation to said amplifier device; a first load circuit means comprising the parallel combination of a resistor and capacitor; a second load circuit means comprising a resistor; means galvanically connecting said first and second load circuit means in series with one another to form a galvanically conductive composite load circuit means; a source of anode polarizing potential having a first terminal thereof galvanically connected to said cathode designated and a second terminal thereof designated for galvanic polarizing connection to said anode; means connecting said composite load circuit means between said anode and the second terminal of said polarizing potential source such that first load circuit means is adjacent said anode and said second load means is adjacent said polarizing potential source, means whereby said resistor and capacitor in said first load circuit means cause accentuation of said synchronizing components at said anode; means whereby the resistor in said second load circuit means develops at the junction of said first and second load circuit means a relatively uniform amplified representation of said scene brightness component; and a galvanically conductive degenerative feedback circuit path means galvanically connected between said screen grid and the junction of said first and second load circuit means applying polarizing potential to said screen grid and increasing the value of said predetermined maximum anode current above which undesirable non-linearity in said transfer characteristic appears whereby accentuated synchronizing components appear at said anode and amplified wideband scene brightness component appear at said junction.

8. Apparatus according to claim 7 wherein an inductor is serially included in said degenerative feedback circuit path means.

9. Apparatus according to claim 8 wherein said means coupled between said cathode and control grid for applying television signals in driving relation to said amplifier includes a galvanic connection to a television receiver signal demodulator delivering a direct current component representing television carrier intensity and average picture brightness in a polarity sense causing reduction in screen grid current upon the demodulation of weak television signal carriers.

10. In a television receiver apparatus for reducing the average value of screen current dissipation in a given screen grid type amplifier operated as a video amplifier the combination of: a source of demodulated video signal having a direct current component representing received signal strength and average scene brightness; an amplifier having electrodes corresponding to a control grid, cathode, anode and screen grid, said screen grid having associated therewith inherent stray circuit capacitance; means direct current connecting said control grid and cathode in driven relation to said source of video signal resulting in changes in average current flow in said amplifier as a function of variations in signal strength and scene brightness; a source of output circuit polarizing potential having a first and second terminals the first of which is galvanically connected to said cathode; a galvanically conductive compound load circuit for said anode comprising a first and a second resistance means serially connected with one another to form a combination, said combination being connected between said anode and the second terminal of said polarizing potential source, means whereby said resistance means provides a substantially uniform video signal output at the junction of said resistance means; and a galvanically conductive negative feedback circuit connected between the junction of said first and second resistance means and said screen electrode.

11. Apparatus according to claim 10 wherein said negative feedback circuit comprises an inductor the value of which is adjusted relative to said stray circuit capacitance to provide development at said screen grid of a video signal having substantially uniform frequency representations; and a resistor connected from said screen grid to a potential source referenced to said cathode, said potential source being of the same polarity as but of a value less than that delivered at said second terminal of said polarizing potential source.

12. In a wide band untuned amplifier system for translating a first and second adjacent bands of frequencies, said amplifier including an electron discharge device having at least an anode, a control grid and screen electrode, and having a source of wide band signals of the type described coupled in driving relation to the control electrode, the improvement comprising a load circuit for said amplifier comprising a frequency accentuation circuit including means electrically accentuating said first band of frequencies to the relative exclusion of said second band of frequencies and a linear frequency response circuit embracing both bands of frequencies connected in series with one another; a connection from the accentuation circuit end of said load circuit to said anode electrode for developing output signals from said anode across said load circuit; a signal feedback connection including means communicating both bands of frequencies from a point on said load circuit between said frequency accentuation circuit and said linear frequency response circuit to said screen electrode; and means for deriving an output signal from across said linear frequency response circuit of said load circuit.

References Cited in the file of this patent

UNITED STATES PATENTS

| | | |
|---|---|---|
| 2,254,855 | Poch | Sept. 2, 1941 |
| 2,584,332 | Crooker et al. | Feb. 5, 1952 |
| 2,610,261 | Wofford | Sept. 9, 1952 |

OTHER REFERENCES

Rider's Television Manual, vol. 10, General Electric TV, pages 10–19 (Model 20C151), copyright Nov. 21, 1952.

RCA Service Data 1952 No. T.4 (KCS72A chassis), first printing June 13, 1952; see circuit diagram.